US006343024B1

United States Patent
Zabroda

(10) Patent No.: US 6,343,024 B1
(45) Date of Patent: Jan. 29, 2002

(54) SELF-ADJUSTABLE IMPEDANCE LINE DRIVER WITH HYBRID

(75) Inventor: Oleksiy Zabroda, Kanata (CA)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/597,599

(22) Filed: Jun. 20, 2000

(51) Int. Cl.[7] .............................................. H02M 3/335
(52) U.S. Cl. ........................ 363/22; 323/364; 323/316; 323/208
(58) Field of Search .............................. 363/13, 22, 23, 363/133; 323/315, 316, 363, 364, 365, 355, 367, 369, 208, 209

(56) References Cited

U.S. PATENT DOCUMENTS

| | | | | |
|---|---|---|---|---|
| 4,254,458 A | * | 3/1981 | Griffith .................... | 323/209 X |
| 4,798,982 A | | 1/1989 | Voorman .................... | 307/490 |
| 5,121,080 A | | 6/1992 | Scott, III et al. ........... | 330/260 |
| 5,249,225 A | | 9/1993 | Williams .................... | 379/404 |
| 5,459,440 A | | 10/1995 | Claridge et al. ........... | 333/17.3 |
| 5,510,751 A | | 4/1996 | Nauta .......................... | 330/84 |
| 5,585,763 A | | 12/1996 | Navabi et al. .............. | 330/255 |
| 5,936,393 A | | 8/1999 | Nauta .......................... | 323/316 |
| 5,973,490 A | | 10/1999 | Nauta .......................... | 323/316 |

OTHER PUBLICATIONS

B. Nauta et al., "Analog Video Line Driver with Adaptive Impedance Matching", ISSCC98, Session 20, SA 20.1 Feb. 7, 1998.

R. Mahadevan et al., "A Differential 160MHz Self–Terminating Adpative CMOS Line Driver", ISSCC2000, Session 26, WP 26.6, Feb. 9, 2000.

D. Johns et al., "Integrated Circuits for Data Transmission Over Twisted Pair Channels", 1997 IEEE Journal of Solid-State Circuits, vol. 32, No. 3, Mar. 1997, pp. 398–406.

* cited by examiner

*Primary Examiner*—Jessica Han
(74) *Attorney, Agent, or Firm*—Lisa K. Jorgenson; Andre Szuwalski

(57) ABSTRACT

A pair of equivalent controlled impedance buffers are connected in a push-pull configuration to a transformer primary coil. A pair of equivalent pre-drivers are connected to the pair of buffers. Each pre-driver receives a driver input signal and outputs a buffer input signal (based on the input signal) and a DC offset compensation signal. Each buffer receives the buffer input signal from its associated pre-driver for buffered output as a line driver signal to the primary coil. Each buffer further receives the DC offset compensation signal generated its pre-driver to compensate for an offset introduced by the transformer. A balanced bridge hybrid is also connected between the buffer output and internal nodes. An adjustment circuit processes the hybrid output during training mode to generate an adjustment signal for application to an adjustable current source within each buffer. By manipulating the adjustable current source with the adjustment signal, the output impedance of the buffer can be made to match the characteristic impedance of a transmission line connected to the transformer secondary coil.

28 Claims, 11 Drawing Sheets

SELF-ADJUSTABLE IMPEDANCE LINE DRIVER WITH HYBRID

CROSS REFERENCE TO RELATED APPLICATIONS

This application for patent is related to previously filed, co-pending, commonly owned U.S. Applications for Pat. Ser. Nos. 09/497,980 and 09/498,038 filed Feb. 4, 2000, the disclosures of which are hereby incorporated by reference.

BACKGROUND OF THE INVENTION

1. Technical Field of the Invention

The present invention relates to a line driver having a self adjustable output impedance and, in particular, to a transformer line driver with a hybrid.

2. Description of Related Art

Line drivers having a controlled output impedance are well known in the art. See, B. Nauta, et al., "Analog Video Line Driver with Adaptive Impedance Matching," ISSCC98, pp. 318–19, 1998. A simplified schematic of one such driver 10 is illustrated in FIG. 1A. The driver 10 (also referred to as a "buffer") comprises an operational amplifier 12 whose negative input terminal receives an input voltage Vin. The output terminal of the operational amplifier 12 is connected to the gates of two field effect transistors 14 and 16, where the illustrated "N" value is equal to the ratio of their respective drain currents. The sources of the field effect transistors 14 and 16 are connected to a reference voltage Vdd. The drains of the field effect transistors 14 and 16 are connected to each other by a resistor (R1) 18. The drain of the field effect transistor 14 is connected in a feedback fashion to the positive input terminal of the operational amplifier 12, and is also connected to ground through a resistor (R2) 20. An output voltage Vout is supplied from the drain of the field effect transistor 16 to drive a transmission line 22 having a characteristic resistance equal to the load resistance (RL) 24. By properly selecting the values of the resistors R1 and R2 for the driver 10 in a well known manner (and as illustrated) with respect to the "N" value and the value of the load resistance RL, the value of the output impedance from the driver may be set (i.e., controlled) substantially equal to the load resistance RL. An advantage of this driver is its reduced power dissipation which makes it very attractive for implementation in an integrated circuit. However, with respect to an integrated circuit fabrication, the precise resistance values needed to achieve substantial matching of driver-line impedance are very difficult to consistently obtain.

It is recognized that it would be advantageous to be able to exercise some adjustment control over the output impedance of the driver following the setting of the resistance values. The driver of FIG. 1A may be modified, as shown in FIG. 1B, to provide for such an adjustment mechanism. Controllable source degeneration (through circuit 30) is applied to the transistors 14 and 16. The current ratio value "N" is electrically tunable (through circuit 30) via application of the voltage Vtune. In this implementation, the driver adapts to match the load resistance RL using a control loop 28 that integrates the current from the output of the transconductance amplifier (28), which results from the voltage output of the drain of transistor (16) from the transistor 16 to generate Vtune for application to circuit 30 resulting in an adjustment to the source current of transistor 14 and a change in the value of N. At low frequencies, the control loop 28 forces Vout to equal Vin, in which case the gain of the driver is one. By then setting the resistances R1 and R2 as discussed above, approximate matching of the output impedance to the load resistance RL is obtained, with the control loop 28 further refining the matching.

Most telecommunications devices utilize transformer decoupling of the driver and the transmission line. Because transformer driver-line decoupling is typically utilized in the push-pull configuration, a direct current output signal related to the load resistance is not available to be integrated by the control loop 28 and produce the adjustment signal Vtune. Furthermore, if the transmission line is relatively long, its direct current resistance is substantially different from the characteristic impedance. In such situations, the precision of the impedance adjustment provided by the FIG. 1B circuit is not sufficient.

One solution to this problem is presented in R. Mahadevan, et al., "A Differential 160 MHz Self-Terminating Adaptive CMOS Line Driver," ISSCC2000, pp. 436–37, 2000, where the gain of the transformer push-pull driver is adjusted to unity by using the low frequency content of the transmitted signal. In this implementation, the driver output signal is filtered and compared with the input signal. Responsive to that comparison, the driver transistor ratio is adjusted to set the gain to unity. This method of driver gain adjustment is effective if the load of the driver is a transmission line having a matched termination at the opposite end. However, in a full duplex architecture where transmission and reception occur through the same line, a similar driver should be located at the opposite end of the transmission line. Typically, at the beginning of the adjustment procedure neither one of these drivers is matched to the line. This causes significant reflections on the signals, which affect the amplitude of the signal at the driver output, and the simultaneous adjustment of both drivers becomes a complex multi-step routine.

In some applications, transmission and reception take place simultaneously through the same transmission line. A hybrid device or circuit is typically connected to split the transmitted and received signals. It is conventional to utilize voltage mode drivers in modern wireline communications devices. In such cases, additional resistors are often connected in series with the line driver to effectuate line impedance matching. As an example, these additional resistors may be used to build a balanced bridge hybrid circuit. Unfortunately, the differential output of such a circuit has a common mode voltage equal to the transmitted signal, and this results in a substantial increase in transmitted signal echo. As a further drawback, if such a hybrid circuit is used in a self-terminated driver there is a substantial reduction in power saving efficiency.

There is accordingly a need for a line driver possessing a self-tuned output impedance and operable in an efficient manner with a hybrid for application in communications devices where transmission and reception occur simultaneously over the same transmission line. Such a driver would preferably be inexpensive to fabricate and present a relatively simple method for tuning gain, adjusting output impedance and balancing the hybrid.

SUMMARY OF THE INVENTION

A line driver circuit with hybrid is provided for connection to a signal transmission line. The circuit includes a controlled or synthesized impedance buffer. The line driver circuit further includes an adjustment circuit that processes an output from the hybrid during training mode and generates an adjustment signal for application to an adjustable controlled current source within the buffer. By manipulating the adjustable controlled current source with the adjustment signal, the output impedance of the buffer can be made to substantially match the characteristic impedance of a transmission line connected to the driver.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figures 1, 2A:
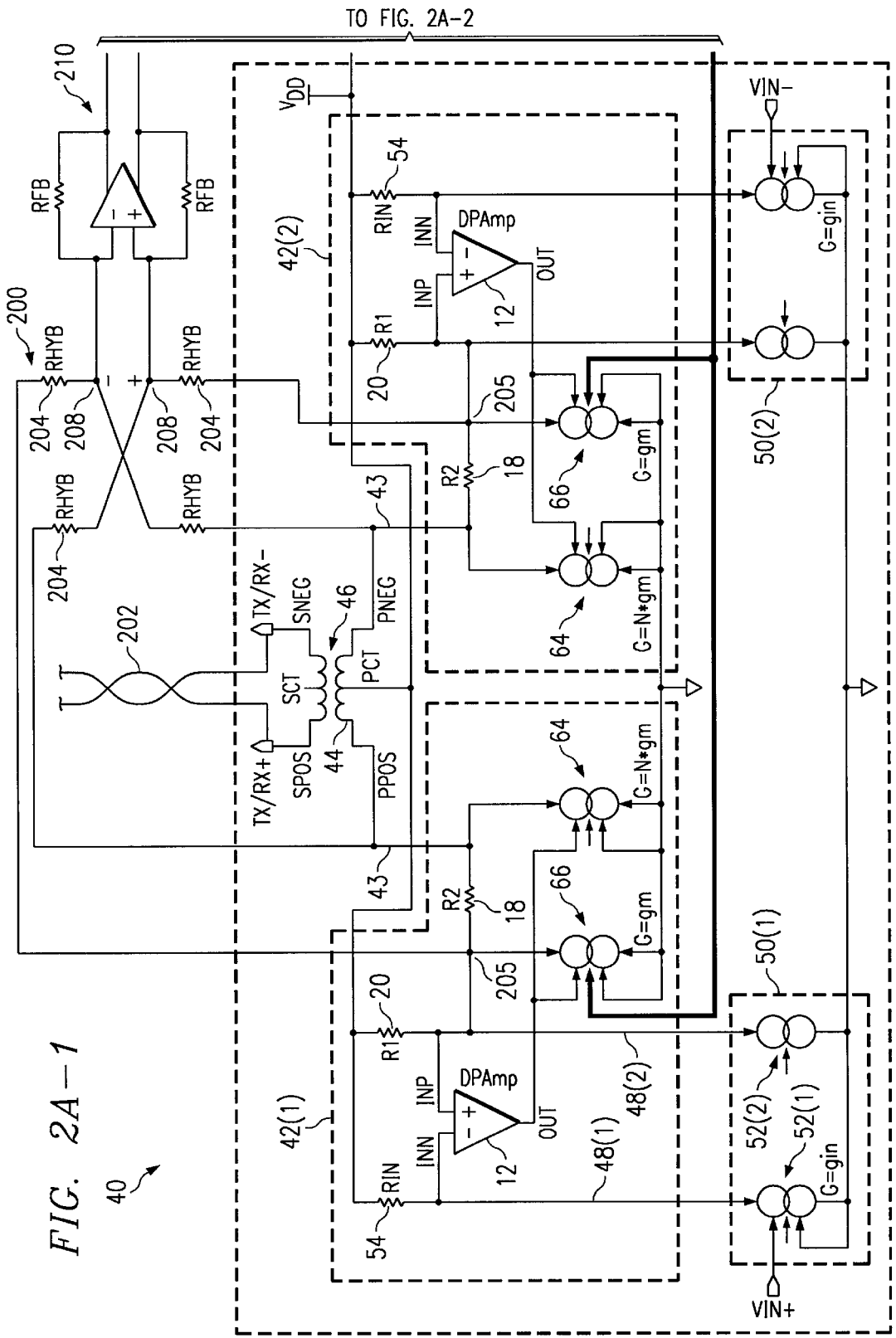
FIG. 2A is a schematic diagram of a transformer line driver with adjustable output impedance and hybrid in accordance with the present invention.
Figures 2, 2A:
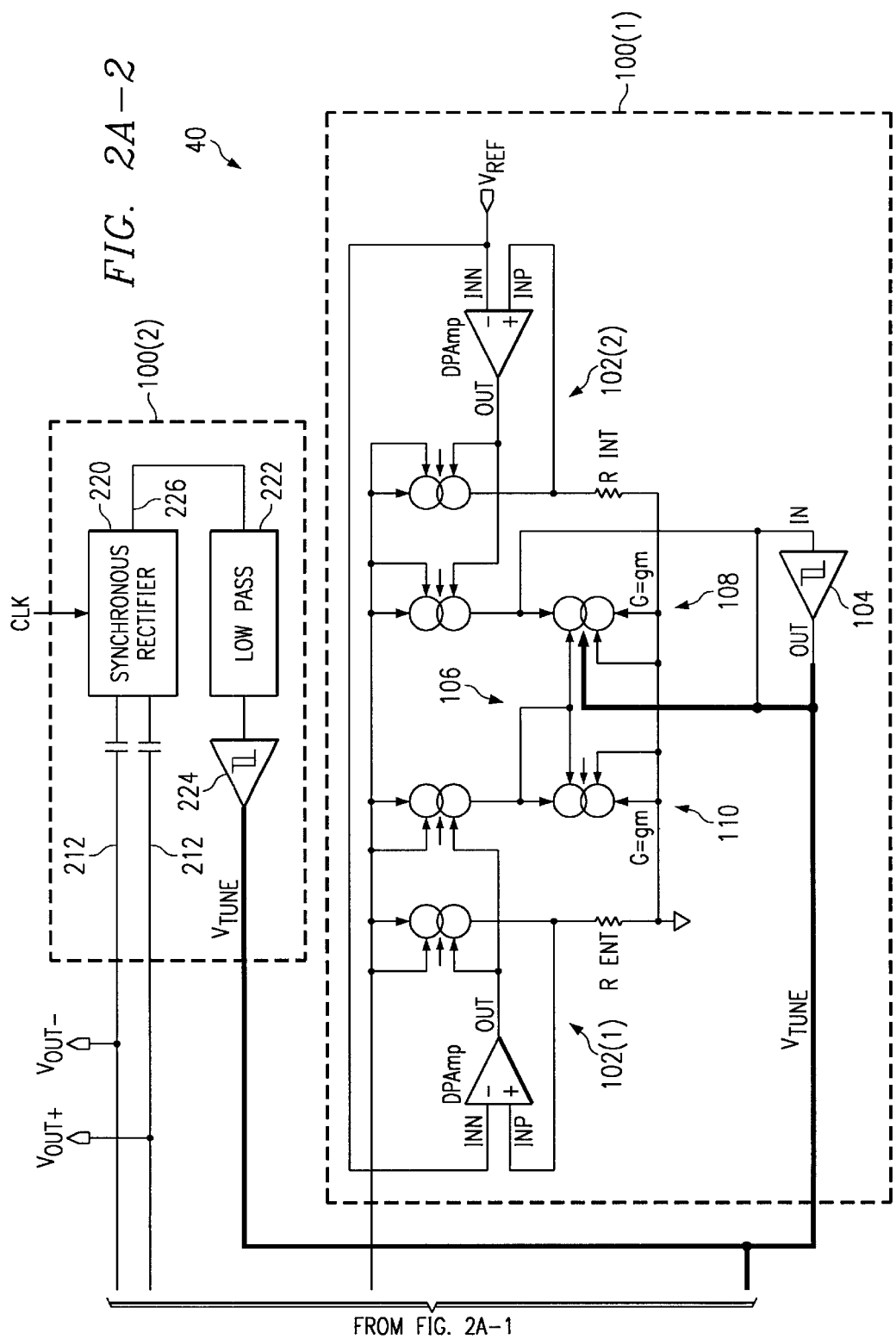

Reference is now made to FIG. 2A wherein there is shown a schematic diagram of a transformer line driver 40 with adjustable output impedance and hybrid 200 in accordance with the present invention. The driver 40 may comprise a discrete device (such as implemented as a semiconductor chip or a circuit) or alternatively be implemented in a communications device (as shown in FIG. 2E connected to a communications device operating circuit) wherein the device comprises, for example, a physical medium attachment of fast Ethernet transceiver or some other wireline communications circuit like ADSL, HDSL, ISN, E1/T1, and the like. The driver 40 includes a pair of identical controlled or synthesized impedance buffers 42(1) and 42(2) whose outputs 43 are connected to the end terminals of a center tapped primary coil 44 of a transformer 46 in a configuration constituting a push-pull circuit. Each buffer 42 may comprise the illustrated buffer, a buffer/driver similar or equivalent to that shown in FIG. 1, or another buffer/driver which provides a controlled or synthesized output impedance preferably with reduced power dissipation characteristics suitable for integrated circuit fabrication. Each buffer 42 includes a pair of inputs 48(1) and 48(2). In the specific implementation illustrated these inputs are applied to the negative and positive input terminals, respectively, of the included operational amplifier 12. One input 48(1) receives a buffer input signal, while the other input 48(2) receives a DC offset compensation current (the purpose of which will be described later).

The buffer input signal applied to the first input 48(1) of each buffer 42 provides an input current that is passed through the buffer and output on line 43 as a line driver signal for application to an end terminal of the center tapped primary coil 44 for the transformer 46. While outputting the line driver signal, the buffer 42 maintains the value of its output impedance for the connection to the transformer 46 in a condition set during a previously completed training mode substantially equal to the characteristic impedance RL of a twisted pair transmission line 202 connected at TX/RX+ and TX/RX− terminals of the secondary coil. The signal that is applied to the second input 48(1) provides a current comprising the DC offset compensation signal to each buffer 42 that is needed to account for an unacceptable offset to the buffer operational mode introduced because the transformer 46 has no DC resistance.

The driver 40 includes a pair of pre-driver circuits 50 and 50. Each pre-driver circuit 50 receives an input signal (Vin in differential +/− format) and using a first current source 52(1) therein outputs a first signal comprising the buffer input signal for application to the first input 48(1) of its associated buffer 42. It will be understood that the sources 52(1) of the pre-drivers 50 may alternatively be implemented as a differential circuit (to process the received driver input voltage signal and generate the appropriate input voltage signals) instead of having two equivalent pre-drivers 50. Each pre-driver circuit 50 further includes a second current source 52(2) to generate and apply the current comprising the DC offset compensation signal for application to the second input 48(2) of its associated buffer 42. This value of the current (I) for this DC offset compensation signal as generated by the constant second current source 52(2) of the pre-driver 50 is:

$$I = Io * Rin / R2$$

where:

Io is the quiescent current of the current sources 52(1) and 52(2);

Rin is the resistance value for the resistor 54; and

R2 is the resistance value for the resistor 18.

Figure 1A:
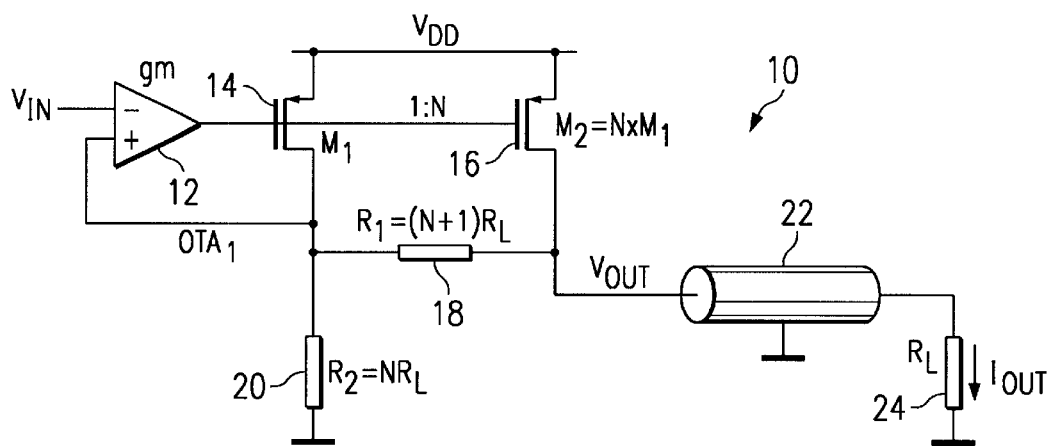
FIGS. 1A and 1B, previously described, are schematic diagrams of prior art line drivers having a controlled and tunable, respectively, output impedance.
Figure 1B:
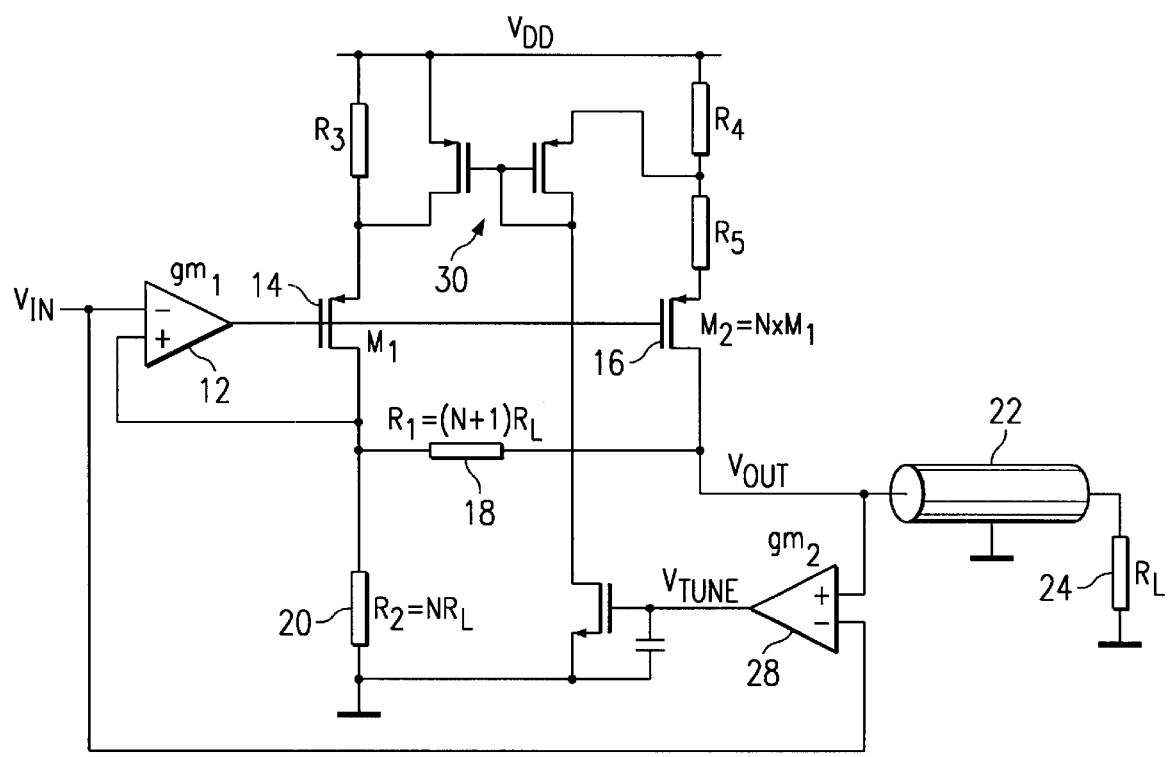

Still further, each buffer 42 includes a fixed controlled current source 64 and an adjustable controlled current source 66. The adjustable controlled current source 66 receives an adjustment signal (Vtune) output from an impedance adjustment circuit 100. The signal Vtune adjusts the current being passed by the source 66, and thus (in comparison to the current of the fixed source 64) affects the value for the current ratio "N". By properly tuning the value of N, the value of the output impedance may be more narrowly focused to match that of the load resistance RL (in a manner similar to that as discussed above in connection with FIG. 1B). When impedance is set and self-adjusted in the above-recited manner, the driver 40 operates with substantially perfect impedance matching with the transmission line.

The transmission line 202 is used for both the transmission and reception of signals. The hybrid 200 accordingly functions in a well known manner to separate the transmitted and received signals from each other. In the present implementation, the hybrid 200 comprises a balanced bridge hybrid design implemented with four equal cross-coupled resistors (Rhyb) 204. The hybrid resistors 204 are connected in pairs such that each pair interconnects an internal node 205 of one buffer (for example, the buffer 42(1)) with the output 43 of the other buffer (for example, the buffer 42(2)). More specifically, in the illustrated exemplary buffer 42, the internal node comprises the interconnection point between the positive terminal of the amplifier 12, the second input 48(2), resistor (R1) 20 and resistor (R2) 18. This internal node has a useful feature in connection with hybrid operation: the voltage at this node is always equal to the transmitted signal, while the received signal penetrating to this node through resistor R2(18) is substantially suppressed by the combination of the operational amplifier 12 and adjustable transconductance connected in a feedback loop. The differential output 208 of the hybrid 200 is taken from the interconnection point between the two resistors 204 comprising each pair. The hybrid differential outputs 208 (+ and −) are applied to the corresponding inputs of a differential amplifier 210, with the amplifier outputs 212 (Vout+ and Vout−) providing the received signal as carried over the transmission line 202.

The values of the resistances and transconductances for the components of each buffer 42 in a preferred embodiment are set as recited with respect to the driver/buffer 10 of FIG. 1 (subject to consideration of the hybrid 200, if required, as discussed below) in order to provide a controlled output impedance matching the characteristic impedance RL of the transmission line. The output of the first current source 52(1) of a pre-driver 50 (whose transconductance is defined by G=gin) is connected to the negative input terminal of the operational amplifier of a buffer 42 (to provide the buffer input signal) and the output of the second current source 52(2) of that same pre-driver 50 is connected to the positive input terminal of the operational amplifier of the same buffer (to provide the DC offset compensation signal). The values of the resistances must take into account the presence of the hybrid resistors 204, and accordingly the value of the resistor (R2) 18 may be set to satisfy the following:

$$2R2*Rhyb/(R2+Rhyb)=(N+1)*RL$$

and the value of the resistor (R1) 20 may be set to satisfy the following:

$$2R1*Rhyb/(R1+Rhyb)=N*RL$$

Given the illustrated configuration, it is recognized that if the input signal (Vin) has only a constant common mode potential, then the hybrid output 212 will similarly have only a constant common mode potential. This serves to substantially improve rejection of the transmit echo signal.

Furthermore, if a received signal on transmission line 202 appears at the secondary coil of the transformer 46, that signal will not penetrate to the inputs 48(2) due to the feedback implemented by the operational amplifiers 12. This means that the differential received signal is present only on one resistor in each hybrid resistor 24 pair. If this were not so, then due to the operation of the differential amplifier 210 in the hybrid 200, the hybrid output (Vout+ and Vout−) would be equal to only half of the received signal. The differential amplifier 210 accordingly advantageously increases the efficiency of the hybrid 200, with the value of the output signal being related to the value of the input signal by the ratio of the feedback resistor (Rfb) to the hybrid resistor (Rhyb).

The impedance adjustment circuit 100 includes two components that may be individually used, or (as preferred) used in a complementary manner, to set (tune) the output impedance of the device.

A first component 100(1) includes two current sources 102(1) and 102(2), a converter 104 and a current mirror 106. The current mirror 106 includes an adjustable branch 108 and a fixed branch 110. The first current source 102(1) produces a stable current that it derives from the value of a precise reference voltage Vref and a stable precise resistor Rext. The second current source 102(2) produces a current that it derives from the value of the resistor Rint. In a preferred embodiment of the line driver implemented on an integrated circuit, the resistor Rint comprises an internal resistor residing in the integrated circuit chip, and the resistor Rext comprises a specially selected resistor residing external to the integrated circuit chip and electrically connected to the pins of the chip. Advantageously, the value of the resistor Rint is subject to the same process and temperature variations as the other "internal" resistors of the line driver (such as those resistors included in the buffer 42). The first current is applied to the input (branch 110) of the current mirror 106. The second current is applied to the output (branch 108) of the current mirror 106. The converter 104 receives the voltage output from the current mirror 106 (branch 108), compares it to some predetermined upper and lower limits and outputs (as Vtune) a digital code and a residual analog signal indicative of the results of that comparison. The converter 104 generated output Vtune accordingly comprises a combined digital/analog output that is applied to the adjustable branch 108 of the current mirror 106 to keep its output signal within some predetermined limits. In this specific case, the output Vtune sets the output current from the current mirror 106 equal to the current produced by the second current source 102(2). The output Vtune is also applied, as discussed above, to the adjustable controlled current sources 66 of each buffer 42 to tune the value of N (by controlling driver gain) and thus more narrowly focus the value of the output impedance to match that of the load resistance RL.

In the case when this component of the adjustment circuit is used solely, both analog and digital portions of the signal can be used on a continuous time mode. However, if this component is used together with the second component, which will be described below, the adjustment should preferably be performed during a training mode and the "result" should be frozen during the regular mode of the communications device operation. In this case it is more convenient to use only the digital portion of the output signal.

If the driver 40 is properly adjusted to the impedance of the transmission line 202, the gain of the buffers therein is unity. In such a case, if the driver receives at is input (Vin+ and Vin−) a differential input signal, the signals at the respective buffer outputs and the inputs 48(1) and 48(2) will be equal. In this situation, the differential output 212 of the hybrid will be zero (presuming that there is no signal being received over the transmission link 202 at the secondary of the transformer 46). On the other hand, again presuming that there is no signal being received over the transmission line 202 at the secondary of the transformer 46, if the driver is not matched to the impedance of the transmission line and receives at is input (Vin+ and Vin−) a differential input signal, the signals at the respective buffer outputs and the inputs 48(1) and 48(2) will be unequal, and the differential output 212 of the hybrid will be non-zero. It is this non-zero output condition that is advantageously processed by the present invention to refine the impedance tuning of the driver.

A second component 100(2) of the impedance adjustment circuit 100 includes a synchronous rectifier (detector) 220, a low pass filter 222 and a converter 224 to process that non-zero output. The synchronous rectifier 220 receives the hybrid differential output (Vout+ and Vout−) on lines 212 (through a pair of decoupling capacitors) and outputs a signal on line 226 whose DC content indicates the sign and degree of any dis-balance between the driver 40 and the line 202 (e.g., caused by a mismatch in impedance and indicated by a non-zero hybrid differential output due to a difference existing between the buffer output and internal node). The line 226 signal is filtered by filter 222 to remove any high frequency components and applied to the converter 224. The converter 224 produces a digital output Vtune (indicative of the sign and degree) to the adjustable controlled current sources 66 of each buffer 42 to tune the value of N (by controlling driver gain) and thus more narrowly focus the value of the output impedance to match that of the load resistance RL (and thus reduce the dis-balance between the driver and hybrid). The goal of tuning the value of N is to produce a hybrid differential output (Vout+ and Vout−) on lines 212 that is substantially zero. At this condition, the buffers produce substantially unity gain and the output impedance of the driver substantially matches the value of the characteristic impedance (RL) of the transmission line 202.

Figure 2B:
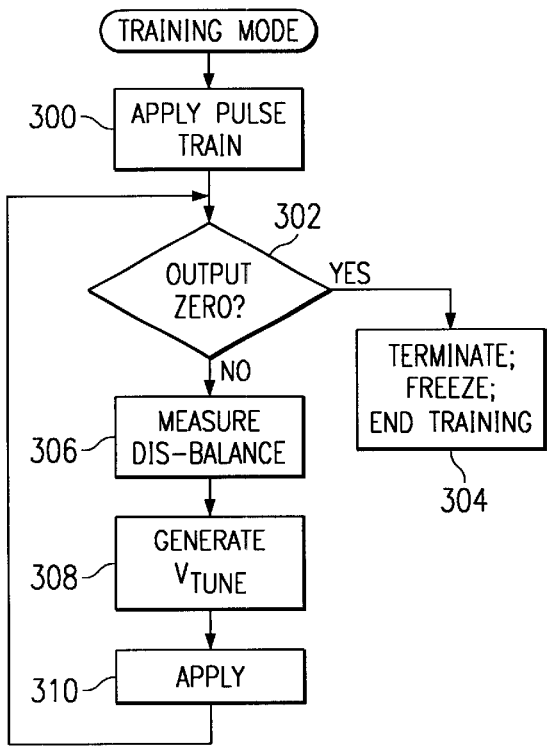
FIG. 2B is a flow diagram for a first embodiment method for tuning the output impedance of the driver of FIG. 2A.

Reference is now made to FIG. 2B wherein there is shown a first embodiment of a method for tuning the output impedance of the driver of FIG. 2A. This method implements an iterative, multi-step process for tuning. The second component 100(2) of the impedance adjustment circuit 100 should operate only during training mode of a communications device connected to a communications line 202. In that training mode, a uniform pulse train is applied (as a differential signal) to the driver inputs (Vin+ and Vin−) without there being any simultaneous receive signal appearing at the transformer 46 (step 300). It will be recognized that if the device whose driver is being tuned by this method is connected to the transmission line 202 and an un-tuned device is connected at the other end of the line, part of the applied uniform pulse train will be reflected and simultaneously appear as a received signal thus rendering this tuning technique ineffective. Hence either a multi-step iteration procedure for the adjustment of the drivers at the both sides of the line should be performed, or a course adjustment by the component 100(1) of FIG. 2A should be performed first before the final adjustment by the method described here with respect to the component 100(2). If the device is properly matched to the line 202, then the output of the hybrid (Vout+ and Vout−) will be substantially zero and no further adjustment need be made to the buffer 42 operation for impedance matching. Accordingly, a test is made in step 302 as to whether the hybrid output is substantially zero (for example, is within a certain offset from zero). If yes, application of the pulse train is terminated, a current value of the converter 224 tuning signal output Vtune is frozen and the tuning method ends (step 304). If not, the sign and degree of the disbalance between the line, driver and hybrid is measured in step 306 by the second component 100(2) (and in particular the synchronous rectifier 220). Put another way, a measurement is made of the direction (sign) and magnitude (degree) of a mismatch between the driver output impedance and the characteristic impedance of the communications line. This is accomplished by driving the rectifier 220 operation with a clock (clk) signal synchronized to the applied uniform pulse train and filtering the resulting output. The digital tuning signal Vtune is then generated in step 308 from the determined sign and degree of dis-balance, with that tuning signal then applied in step 310 to adjust the controlled current sources 66 of each buffer 42 to tune the value of N (by controlling driver gain to approach unity) and thus more narrowly focus the value of the output impedance to match that of the load resistance RL. The process then returns to step 302 to repeat and further refine adjustment. Once the step 302 test has been satisfied and training mode ends, conventional device and driver 40 operation may occur.

Figure 2C:
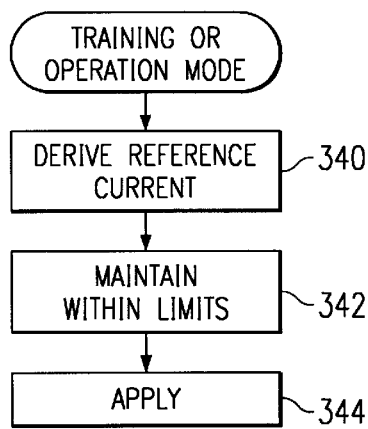
FIG. 2C is a flow diagram for a second embodiment method for tuning the output impedance of the driver of FIG. 2A.

Reference is now made to FIG. 2C wherein there is shown a second embodiment of a method for tuning the output impedance of the driver of FIG. 2A. This method implements a fixed reference process for tuning. The first component 100(1) of the impedance adjustment circuit 100 derives a current in step 340 from the value of a stable precise reference resistor. This derived current represents the fixed transconductance of sources 66 of the driver (FIG. 2A). The converter 104 then processes the derived current in step 342 to ensure that the analog output of combined digital/analog tuning signal (Vtune) remains within some predetermined upper and lower limits (relating to a presumed precision of impedance matching). That tuning signal is then applied in step 344 to adjust the controlled current sources 66 of each buffer 42 to tune the value of N (by controlling driver gain to approach unity) and thus drive the value of the output impedance to match that of the load resistance RL. The method of FIG. 2C may be used not only during a training mode, but also during communications device operation.

Figure 2D:
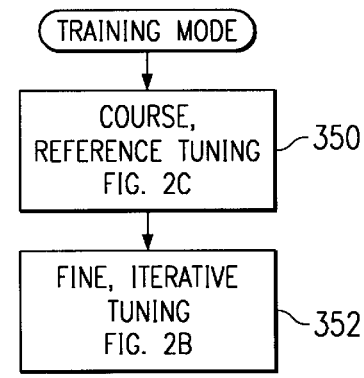
FIG. 2D is a flow diagram for a third embodiment method for tuning the output impedance of the driver of FIG. 2A.
Figure 2E:
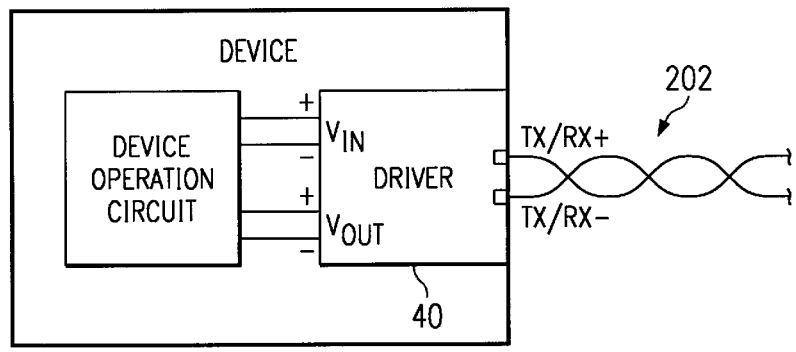
FIG. 2E is a schematic diagram showing the driver of FIG. 2A implemented in a communications device.

Reference is now made to FIG. 2D wherein there is shown a third embodiment of a method for tuning the output impedance of the driver of FIG. 2A. It is worthwhile to utilize in some situations both of the methods described in FIGS. 2B and 2C during training mode. In such a case, the fixed reference process for tuning of FIG. 2C is implemented first (step 350) to provide for coarse adjustment of the value of the output impedance, followed by implementation of the iterative, multi-step process for tuning of FIG. 2B (step 352) to provide for fine adjustment of the value of the output impedance.

Figure 3:
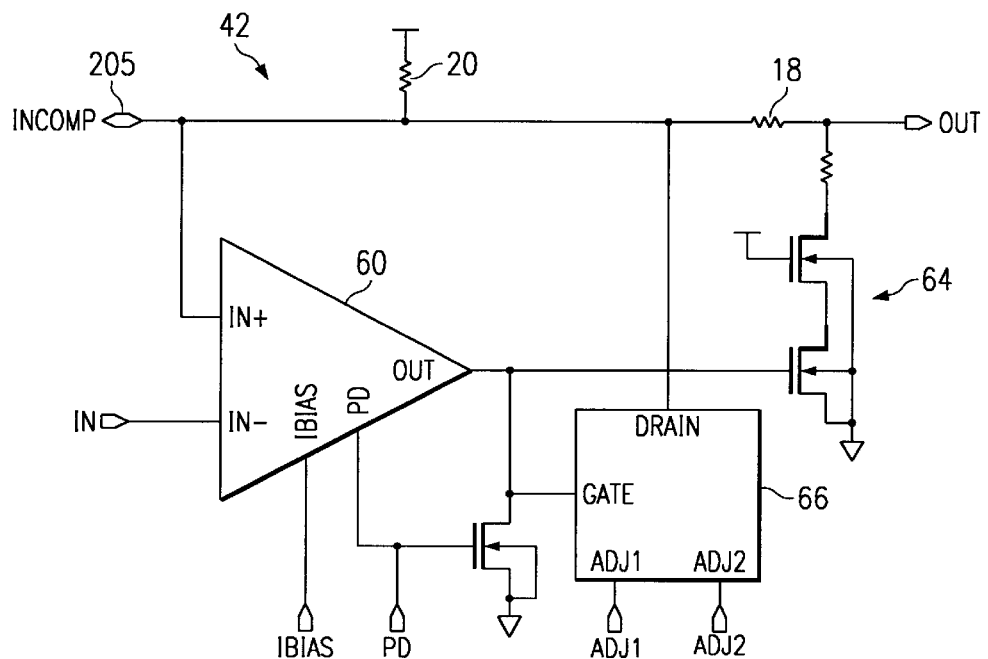
FIGS. 3–15 are schematic diagrams of a possible design for the transformer line driver with adjustable output impedance and hybrid of FIG. 2A as configured for implementation in an integrated circuit.
Figure 4:
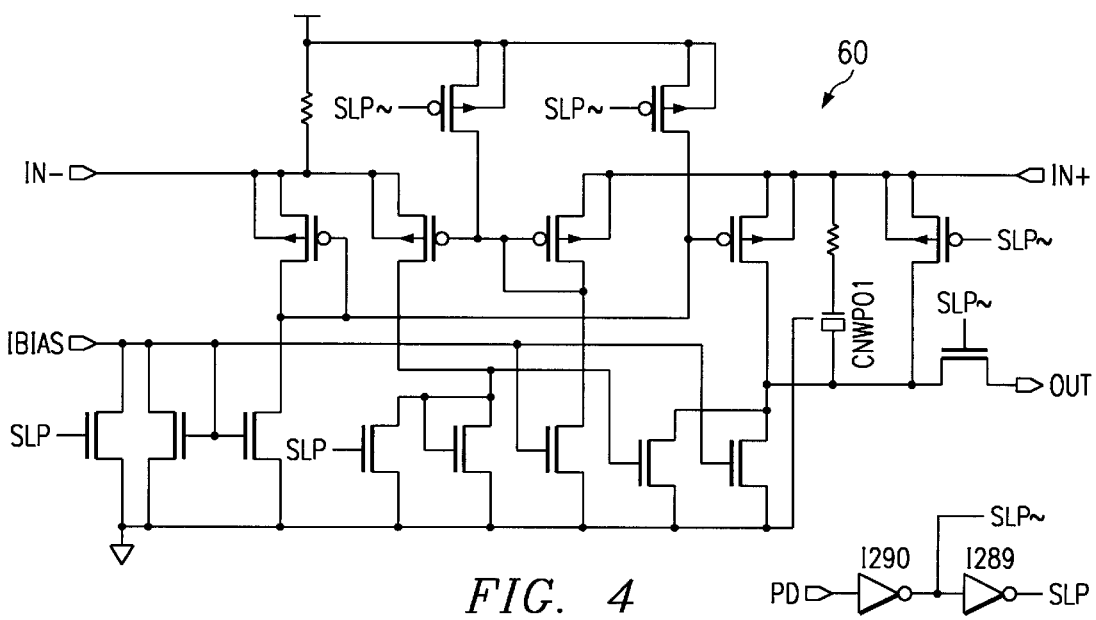
Figure 5:
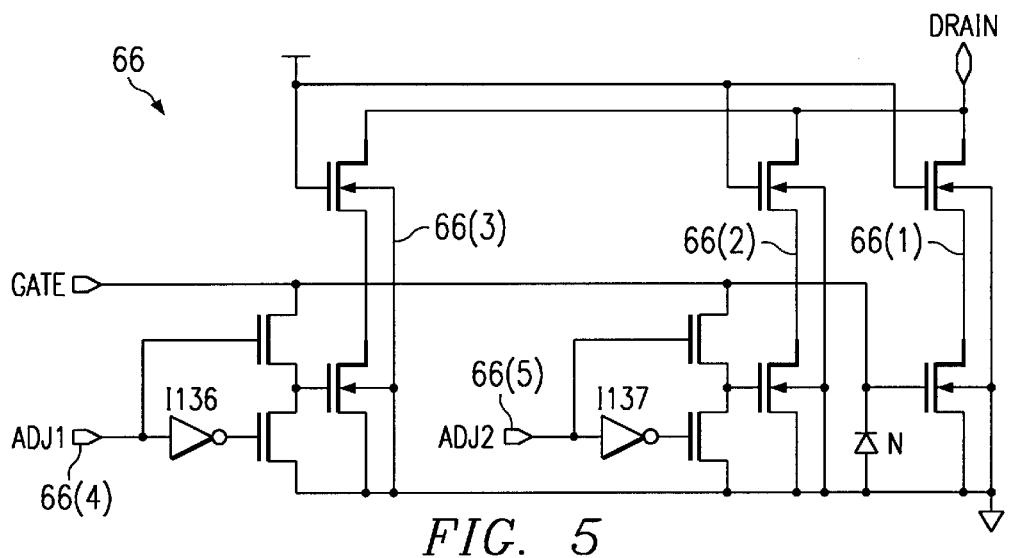

Reference is now made to FIGS. 3–15 wherein there are shown schematic diagrams of one design for the transformer line driver 40 with hybrid of FIG. 2A as configured for implementation in an integrated circuit. Turning first to FIG. 3, there is shown a block diagram for one of the two buffers 42. Each buffer 42 includes an input stage 60 and an output stage. The input stage 60 is equivalent to the operational amplifiers 12 for the buffer 42. A more detailed schematic of the input stage 60 is shown in FIG. 4. Each output stage 62 contains a pair of fixed controlled current sources 64 and a pair of adjustable controlled current sources 66. These components perform the same functions as the current sources 14 and 16 for the buffer 42. A more detailed schematic of the adjustable controlled current source 66 is shown in FIG. 5. This circuit contains a fixed current path and two additional paths 66(2) and 66(3), which are connected in parallel. The additional paths can be enabled or disabled by the control signals ADJ1 66(4) and ADJ2 66(5). This affects the effective transconductance of the circuit. For the sake of simplicity only two additional paths are shown, however it can be any larger number as desired.

Figure 7:
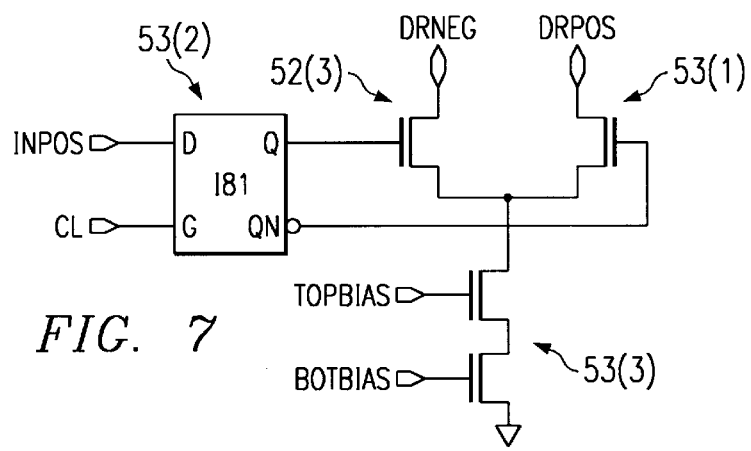
Figure 6:
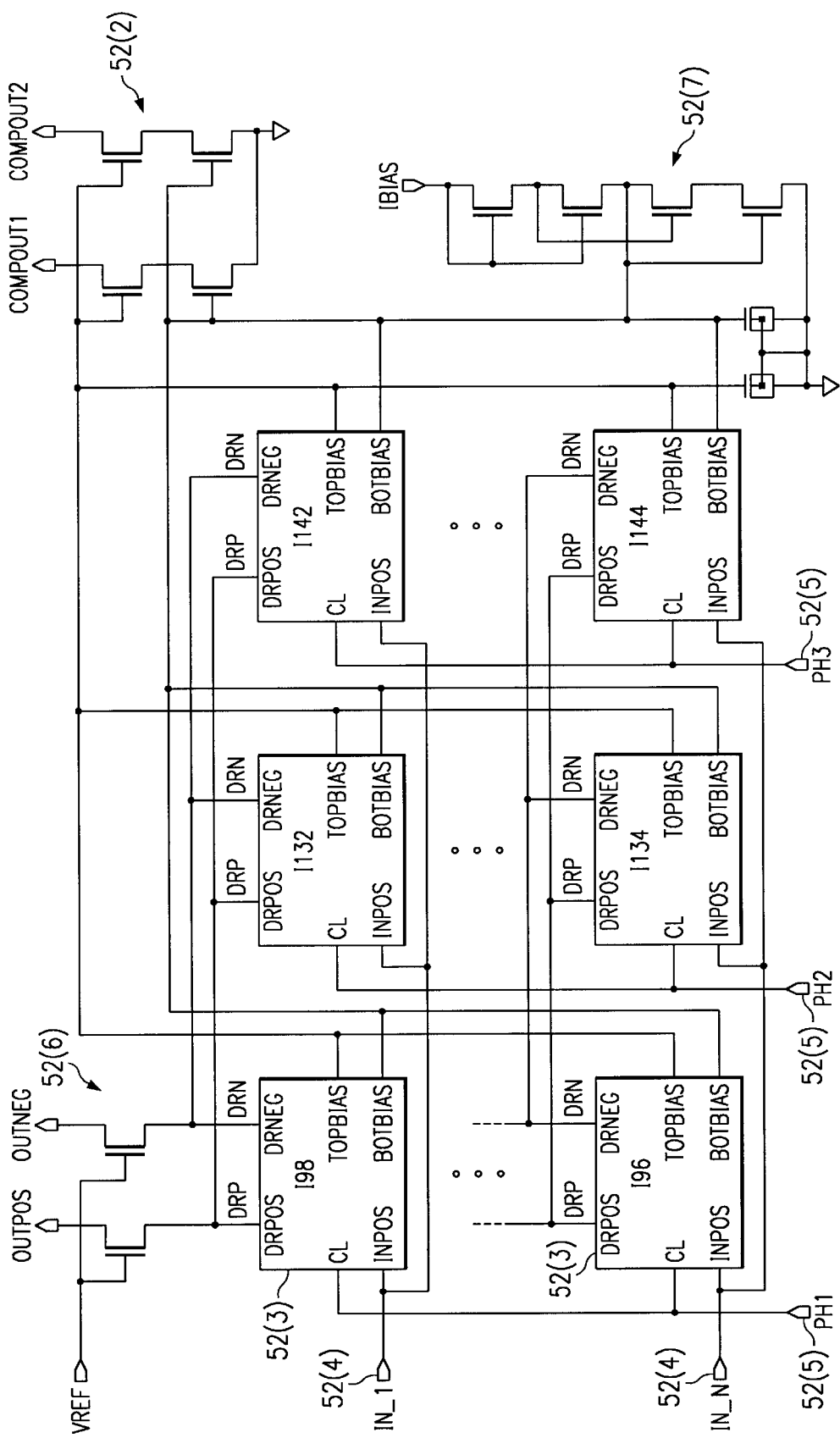
Figure 9:
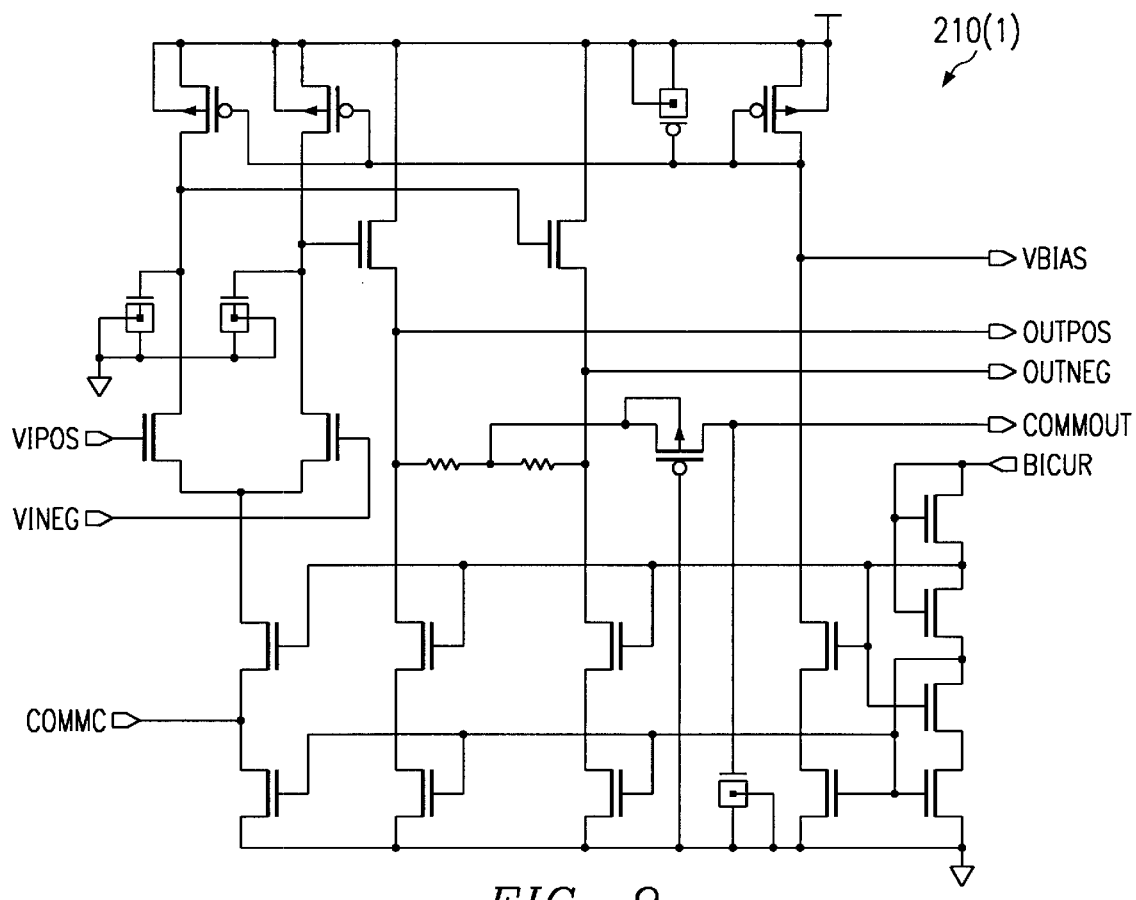
Figure 10:
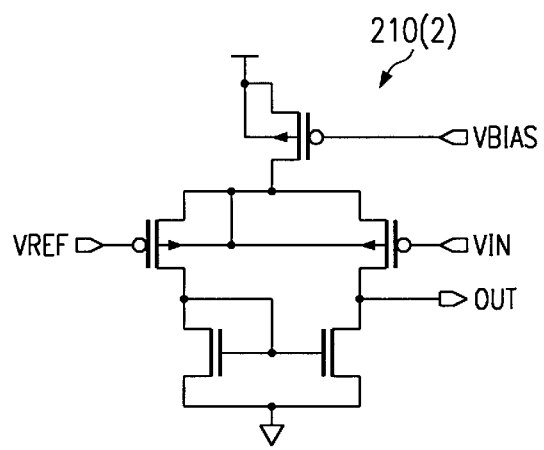

FIG. 6 illustrates a more detailed schematic of predriver circuit 50 of FIG. 2A. The predriver is implemented as a differential current steering D/A converter. It contains a bias voltage generator 52(7) and a set of differential binary weighted switching current sources 52(3). The value of the outputting current is controlled by the input bits 52(4). Every bit is represented by the set of three switching current sources 52(4). Each one is controlled by its phase of the clock 52(5). This is done for the waveshaping control of the driver output pulse. To improve speed of the converter all the switching current sources 52(3) are connected to the sources of the cascode connected transistors 52(6). The drains of these transistors are connected to the input nodes 48(1) of buffers 42 FIG. 2A. The circuit also contains DC offset compensation current sources 52(2). The circuit diagram of the switching current sources 52(3) is shown in FIG. 7. The circuit contains a differential switch 53(1) controlled by D-latch 53(2). The switch is directing the current of source 53(3) either to the output DRNEG or DRPOS according the complementary output of the latch.

Figure 8:
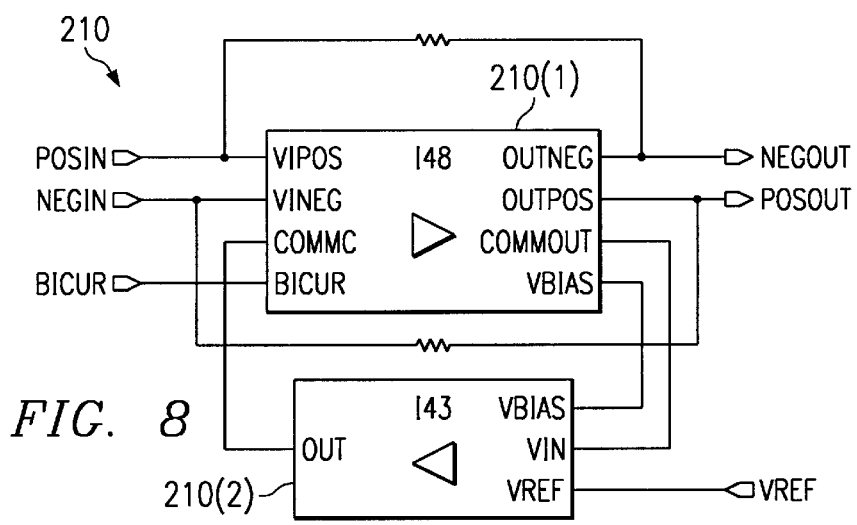

FIG. 8 represents the circuit diagram of differential amplifier 210 FIG. 2A. Amplifier 210 contains differential amplifier-level shifter 210(1) and common mode output voltage control amplifier 210(2). Their schematics are presented in FIGS. 9 and 10, respectively.

Figure 11:
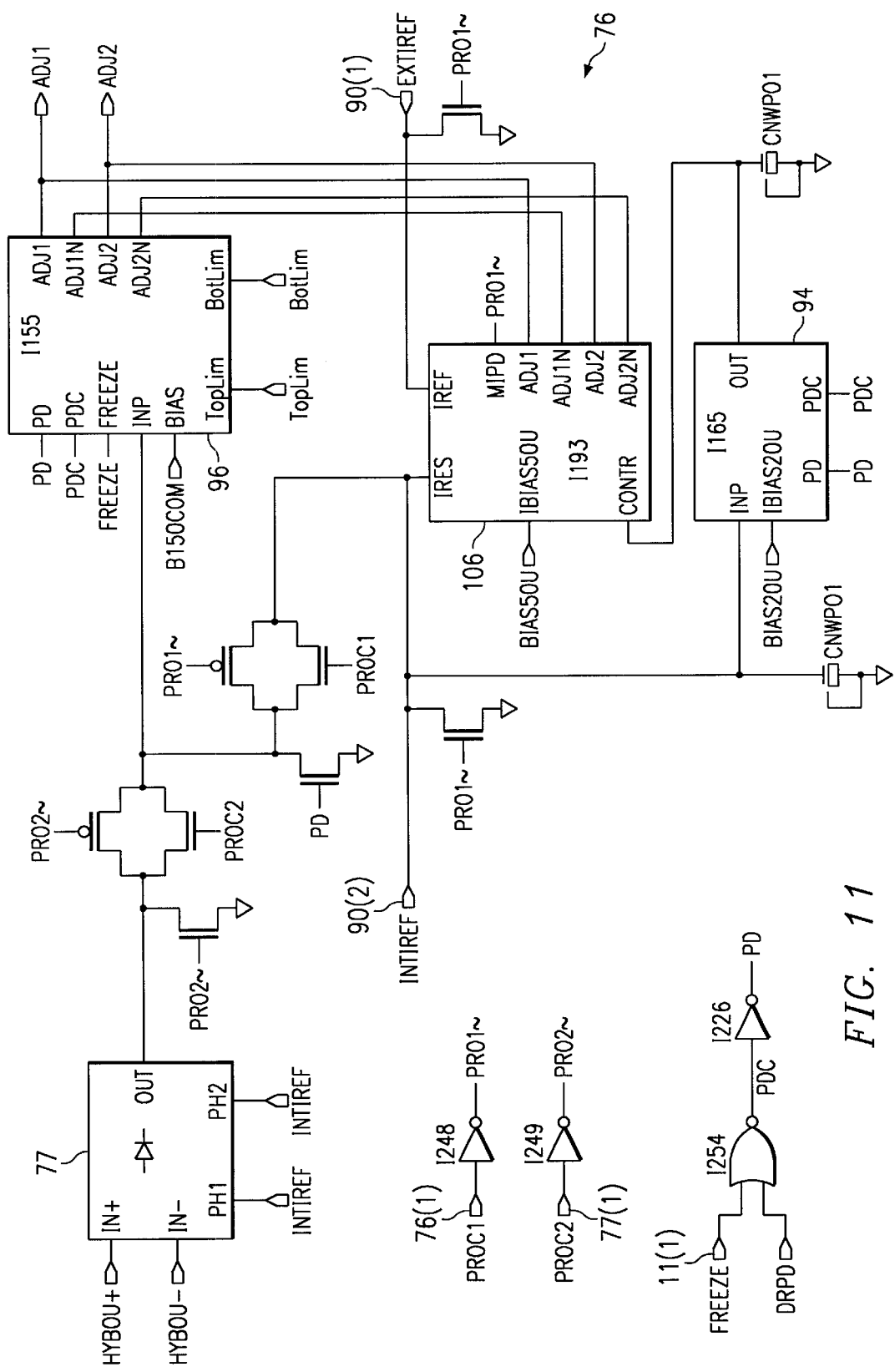

FIG. 11 illustrates a portion 76 (the first component 100(1)) and a portion 77 (the second component 100(2)) of the impedance adjusting circuit 100 for tuning the output impedance of the drivers 42 and the balancing hybrid 200. Portion 76 is enabled by control signal PROC1 76(1), portion 77 is enabled by control signal PROC2 77(1). As was explained above, initially the drivers are tuned by the first component 100(1), then during the training procedure they are finally tuned by the component 100(2). Between and after the tuning procedures the driver tuning signals are frozen by signal FREEZE 11(1). The circuit portion 76 includes inputs 90(1) and 90(2) for receiving the currents derived from the resistors Rext and Rint, respectively. The circuit portion 76 further includes the current mirror 106 and the converter 104 comprising an analog voltage follower 94 and a comparison circuit 96, which is common for circuits 100(1) and 100(2). A more detailed schematic diagram of the voltage follower 94 is provided in FIG. 12. A more detailed schematic diagram of the comparison circuit 96 is shown in FIG. 13. The FIG. 3D illustrates the mode of operation control logic for the driver 42.

Figure 12:
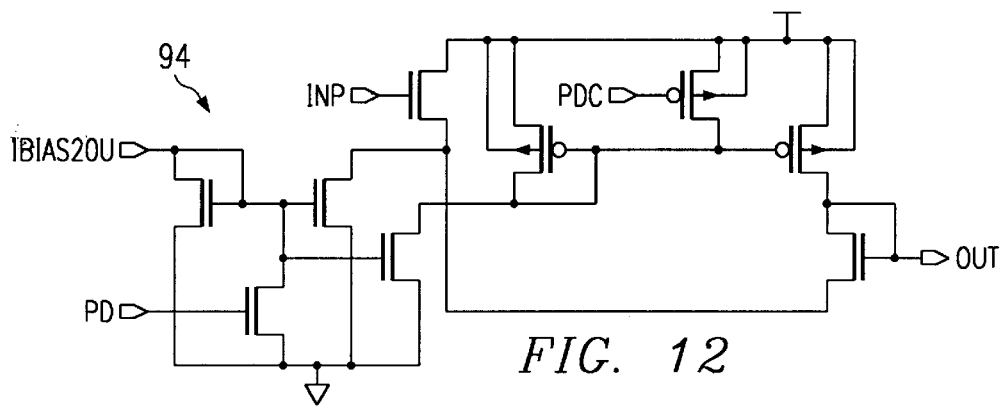
Figure 14:
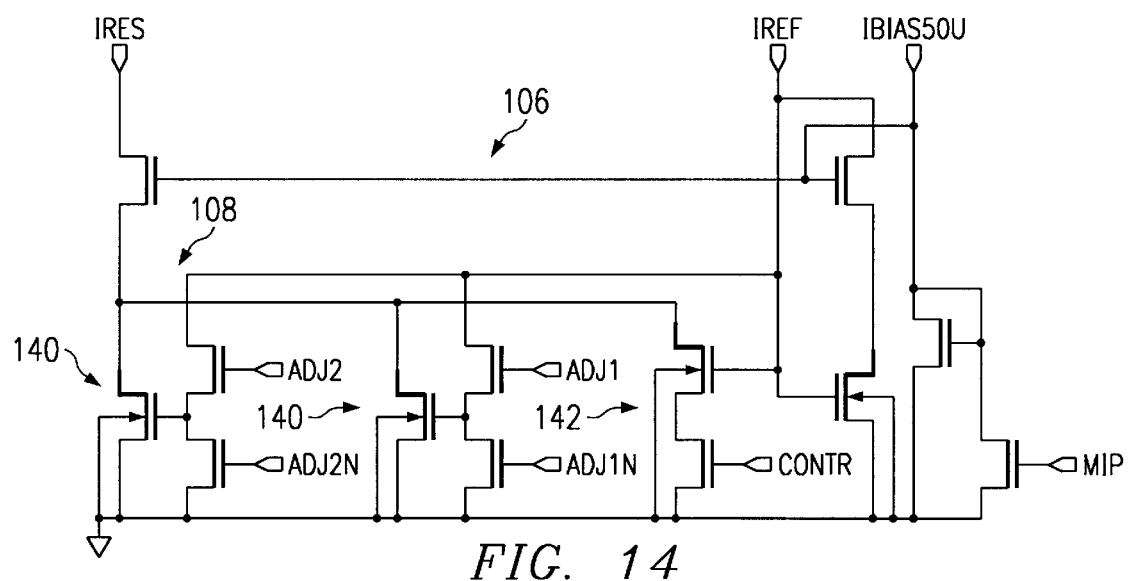
Figure 15:
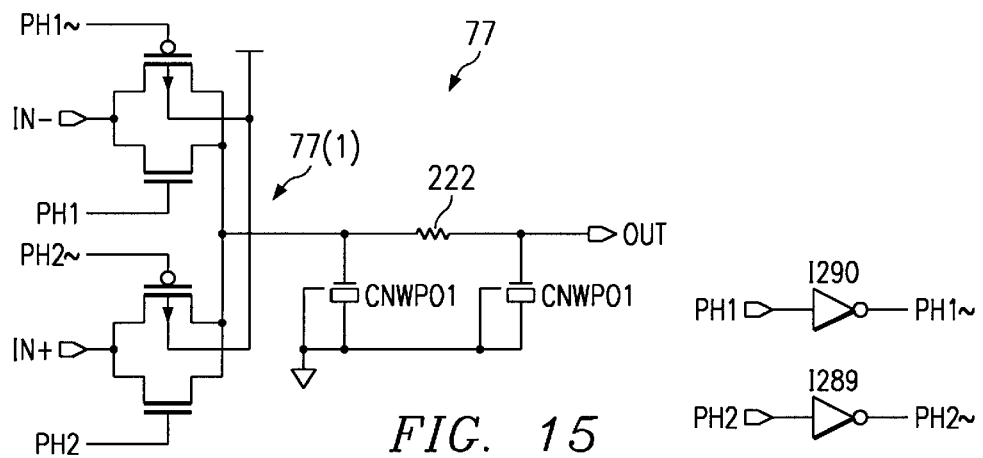
Figure 13:
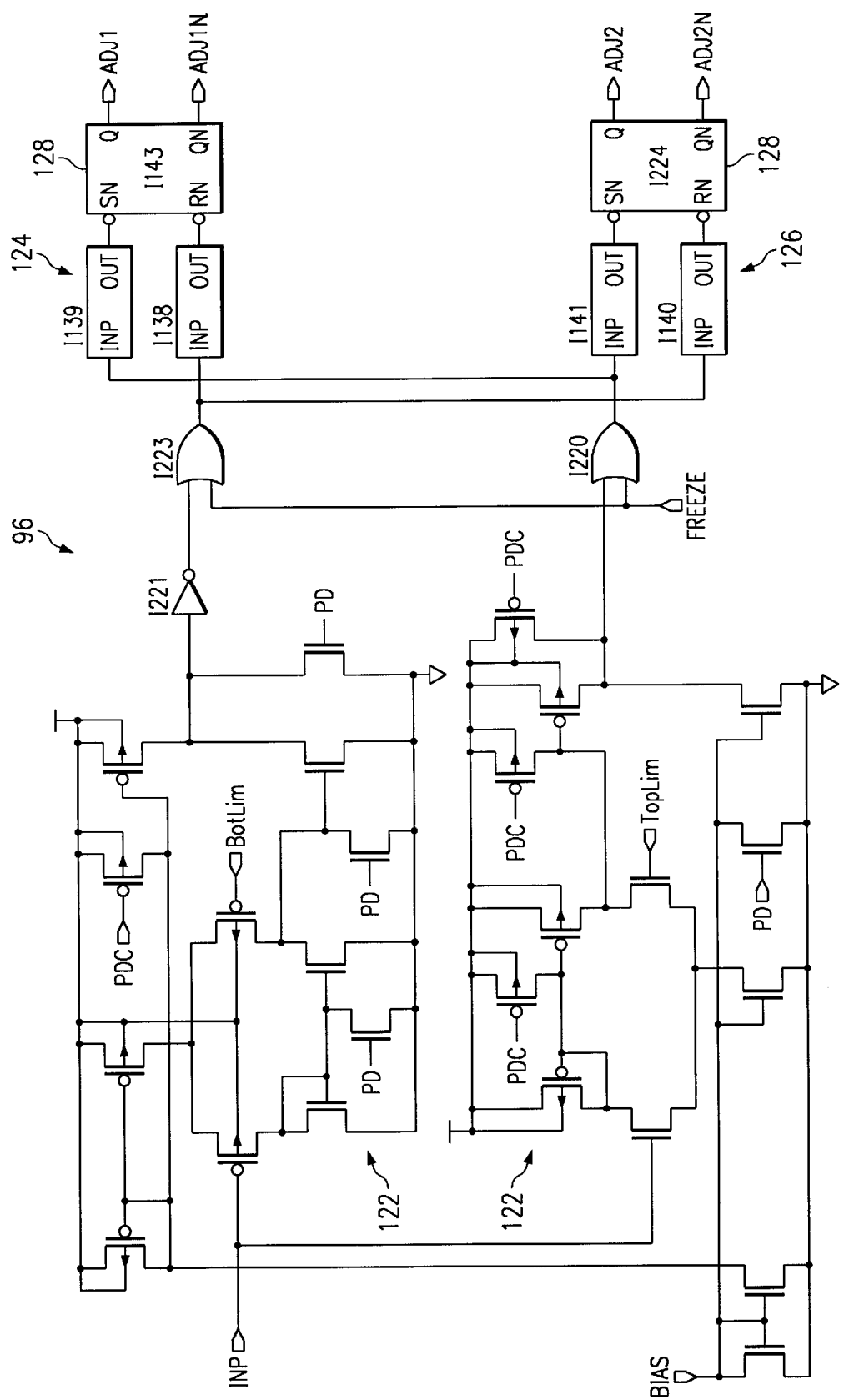

FIG. 12 illustrates a portion 77 (the second component 100(1)) of the impedance adjusting circuit 100 for tuning the output impedance of the drivers 42. A more detailed schematic diagram of the circuit portion 77 is shown in FIG. 15. The circuit portion 77 includes a synchronous rectifier 77(1) receiving the amplified hybrid differential output through input IN– and IN+. The rectifier operation is controlled by a two phase clocks Ph1 and Ph2. The rectifier output is connected to a low pass filter 222. The filtered signal is then processed by the converter 224 comprising a comparison circuit 96. A more detailed schematic diagram of comparison circuit 96 is shown in FIG. 13 (previously described).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A line driver circuit for connection to a transformer having a primary coil, comprising:
    a pair of equivalent controlled impedance buffers for connection in a push-pull configuration to the primary coil, each buffer receiving a buffer input signal for buffered output as a line driver signal to the primary coil, each buffer further including a tuning input connected to an adjustable current source within the buffer whose operation effectuates control over buffer output impedance;
    a hybrid having inputs for connection to the buffers and an output; and
    a tuning circuit that processes a signal received from the output of the hybrid to generate a tuning signal for application to the tuning input of each buffer to adjust operation of the adjustable current source to control the buffer output impedance.

2. The circuit of claim 1 wherein the line driver signal is applied through the transformer to a transmission line having a characteristic impedance, and wherein the tuning signal that adjusts operation of the adjustable current source controls the output impedance of the buffer to substantially match the characteristic impedance of the transmission line.

3. The circuit of claim 1 wherein the tuning signal that adjusts operation of the adjustable current source controls each buffer gain to provide substantially unity gain.

4. The circuit of claim 1 wherein the hybrid comprises:
    a first pair of resistors connecting the buffered output of a first one of the pair of controlled impedance buffers with an internal node within a second one of the pair of controlled impedance buffers; and
    a second pair of resistors connecting the buffered output of the second one of the pair of controlled impedance buffers with an internal node within the first one of the pair of controlled impedance buffers.

5. The circuit of claim 4 wherein the first pair of resistors are series connected at a first node and the second pair of resistors are series connected at a second node, the hybrid further comprising:
    a differential amplifier having an input connected to the first and second nodes and having an output providing the hybrid output signal.

6. The circuit of claim 1 wherein the tuning circuit comprises:
    a detector circuit for detecting the signal received from the output of the hybrid; and
    a comparison circuit receiving the detected signal output from the detector circuit and generating a control signal for application to the tuning input of the buffer to adjust operation of the adjustable current source to control the output impedance of the buffer by driving the signal received from the output of the hybrid substantially to zero.

7. The circuit of claim 6 wherein the detector circuit is a rectifier producing an output signal with a dc content representing the amplitude of the hybrid output signal.

8. The circuit of claim 6 wherein the tuning circuit further includes a filter connected between the detector circuit and comparison circuit to filter the detected signal output from the detector circuit.

9. The circuit of claim 1 further including a second tuning circuit that generates a second tuning signal for application to the tuning input of each buffer to adjust operation of the adjustable current source to control the buffer output impedance, that second tuning signal generated based on a current derived from the value of a resistor selected to substantially match the characteristic impedance of the transmission line.

10. The circuit of claim 9 wherein the second tuning circuit comprises:
    a first current source producing a first current;
    a second current source producing a second current;
    a current mirror having a fixed branch connected to receive the first current and an adjustable branch connected to receive the second current, the current mirror further having a control input to the adjustable branch and having an output; and
    a comparison circuit receiving the current mirror output for comparison to predetermined limits, the comparison circuit generating a control signal for application to the control input of the adjustable branch to maintain the control mirror output within the predetermined limits and generating the tuning signal for application to the tuning input of the buffer to adjust operation of the adjustable current source to control the output impedance of the buffer.

11. The circuit of claim 10 wherein the first current source generates the first current derived from the value of a first resistor selected to substantially match the characteristic impedance of the transmission line and the second current source generates the second current derived from the value of a second resistor.

12. The circuit of claim 11 wherein the line driver circuit is fabricated on an integrated circuit and the first resistor comprises a stable precise resistor external to the integrated circuit and the second resistor comprises a resistor fabricated on the integrated circuit.

13. A communications device, comprising:
   a transformer having a primary coil and a secondary coil wherein the secondary coil is for connection to a communications line having a characteristic impedance;
   a line driver circuit comprising a pair of equivalent controlled impedance buffers for connection in a push-pull configuration to the primary coil, each buffer receiving a buffer input signal for buffered output as a line driver signal to the primary coil, each buffer further including a tuning input connected to an adjustable current source within the buffer whose operation effectuates control over buffer output impedance;
   a hybrid having inputs connected to the buffers and an output; and
   a tuning circuit that processes a signal received from the output of the hybrid to generate a tuning signal for application to the tuning input of each buffer to adjust operation of the adjustable current source to control the buffer output impedance to substantially match the characteristic impedance of the transmission line.

14. The device of claim 13 wherein the tuning signal that adjusts operation of the adjustable current source controls each buffer gain to provide substantially unity gain.

15. The device of claim 13 wherein the hybrid comprises:
   a first pair of resistors connecting the buffered output of a first one of the pair of controlled impedance buffers with an internal node of a second one of the pair of controlled impedance buffers; and
   a second pair of resistors connecting the buffered output of the second one of the pair of controlled impedance buffers with an internal node of the first one of the pair of controlled impedance buffers.

16. The device of claim 15 wherein the first pair of resistors are series connected at a first node and the second pair of resistors are series connected at a second node, the hybrid further comprising:
   a differential amplifier having an input connected to the first and second nodes and having an output providing the hybrid output signal.

17. The device of claim 13 wherein the tuning circuit comprises:
   a detector circuit for detecting the signal received from the output of the hybrid;
   a filter to filter the detected signal output from the detector circuit; and
   a comparison circuit receiving the filtered signal and generating a control signal for application to the tuning input of the buffer to adjust operation of the adjustable current source to control the output impedance of the buffer by driving the signal received from the output of the hybrid substantially to zero.

18. The device of claim 13 further including a second tuning circuit that generates a second tuning signal for application to the tuning input of each buffer to adjust operation of the adjustable current source to control the buffer output impedance, that second tuning signal generated based on a current derived from the value of a resistor selected to substantially match the characteristic impedance of the transmission line.

19. The device of claim 18 wherein the second tuning circuit comprises:
   a first current source producing a first current;
   a second current source producing a second current;
   a current mirror having a fixed branch connected to receive the first current and an adjustable branch connected to receive the second current, the current mirror further having a control input to the adjustable branch and having an output; and
   a comparison circuit receiving the current mirror output for comparison to predetermined limits, the comparison circuit generating a control signal for application to the control input of the adjustable branch to maintain the control mirror output within the predetermined limits and generating the tuning signal for application to the tuning input of the buffer to adjust operation of the adjustable current source to control the output impedance of the buffer.

20. The device of claim 19 wherein the first current source generates the first current derived from the value of a first resistor selected to substantially match the characteristic impedance of the transmission line and the second current source generates the second current derived from the value of a second resistor.

21. The device of claim 13 further including modem communications device circuitry connected to the line driver circuit to supply the buffer input signal for transmission over the communications line and connected to the hybrid output to receive a signal received over the communications line.

22. A method for tuning the output impedance of a line driver connected to a communications line, comprising the steps of:
   transmitting a signal from the line driver with adjustable output impedance over the communications line;
   receiving a hybrid output signal from the communications line;
   determining if the received hybrid output signal is substantially zero;
   if not, measuring from the received non-zero hybrid output signal a degree and sign of an impedance mismatch between the line driver and the communications line; and
   deriving a control signal from the measured impedance mismatch for application to an adjustable current source within the line driver to drive the received hybrid output signal towards zero.

23. The method as in claim 22 wherein the signal comprises a uniform pulse train and the step of receiving comprises the step of synchronously detecting the hybrid output signal.

24. The method as in claim 22 wherein the steps of the method are implemented during a training mode where the signal is transmitted in a condition where there is no simultaneously received signal on the communications line.

25. A method for tuning the output impedance of a line driver connected to a communications line, comprising the steps of:

(A) performing a coarse adjustment by:
  deriving a signal from the value of a resistor selected to substantially match the characteristic impedance of the transmission line; and
  generating a first control signal from the derived signal for application to an adjustable current source within the line driver to control the driver output impedance to substantially match the characteristic impedance of the transmission line; and
(B) performing a fine adjustment by:
  transmitting a signal from the line driver over the communications line;
  receiving a hybrid output signal from the communications line;
  determining if the received hybrid output signal is substantially zero;
  if not, measuring from the received non-zero hybrid output signal a degree and sign of an impedance mismatch between the line driver and the communications line; and
  generating a second control signal from the measured impedance mismatch for application to the adjustable current source within the line driver to drive the received hybrid output signal towards zero.

26. The method as in claim 25 wherein the signal comprises a uniform pulse train and the step of receiving comprises the step of synchronously detecting the hybrid output signal.

27. The method as in claim 25 wherein the steps of the method are implemented during a training mode where the signal is transmitted in a condition where there is no simultaneously received signal on the communications line.

28. The method as in claim 25 wherein the step of deriving comprises the steps of:

generating a first and second currents;

applying the first current to a fixed branch of a current mirror circuit;

applying the second current to an adjustable branch of the current mirror circuit;

comparing an output from the current mirror circuit to some predetermined limits; and maintaining the current mirror output within the predetermined limits.

* * * * *

UNITED STATES PATENT AND TRADEMARK OFFICE
CERTIFICATE OF CORRECTION

PATENT NO. : 6,343,024 B1
DATED : January 29, 2002
INVENTOR(S) : Oleksiy Zabroda It is certified that error appears in the above-identified patent and that said Letters Patent is hereby corrected as shown below:

Column 9,
Line 24, replace "The" with -- The comparison circuit 96 comprises a part of a simple asynchronous two bit successive approximation A/D converter. The A/D converter contains two comparators 122, two pairs of substantially different delays 124 and 126, and two RS latches 128 and the adjustable current mirrors 106. When the input signal of the A/D converter moves out of certain predetermined limits (signals TopLim and BotLim), the least significant bit (LSB) output from one latch 128 for the adjustment signal Vtune is changed first. If this change is enough to move the input signal to within the predetermined limits, then the most significant bit (MSB) output from the other latch is not changed due to the added length of the delay 126. If this LSB change, along with the analog portion of the adjustment signal Vtune output of the voltage follower 94, is not enough to move the input signal to within the predetermined limits, then the MSB output is changed. A more detailed schematic diagram of the adjustable current mirror 106 is provided in FIGURE 14. The current mirror 106 includes an adjustable branch 108 having at least one current path 140 that can be turned on/off responsive to a digital control signal output from the latches 128 (of the comparator 96), and at least one current path 142 controlled responsive to an analog control signal output from the voltage follower 94. Similarly, the adjustable controlled current source 66 (see, FIGURE 5) includes at least one current path 66 (2), 66 (3) that can be turned on/off responsive to a digital control signal output from the latches 128 (of the comparator 96) in order to control the flow of current, directly affect the value "N", and thus maintain the output impedance of the line driver in a matched condition to the transmission line. --

UNITED STATES PATENT AND TRADEMARK OFFICE
CERTIFICATE OF CORRECTION

PATENT NO. : 6,343,024 B1
DATED : January 29, 2002
INVENTOR(S) : Oleksiy Zabroda It is certified that error appears in the above-identified patent and that said Letters Patent is hereby corrected as shown below:

<u>Column 9 cont'd,</u>
Line 27, replace "FIG. 12" with -- FIG. 11 --

Signed and Sealed this

Twenty-sixth Day of November, 2002

*Attest:*

*Attesting Officer*

JAMES E. ROGAN
*Director of the United States Patent and Trademark Office*